(12) United States Patent
Golder et al.

(10) Patent No.: US 6,437,573 B1
(45) Date of Patent: Aug. 20, 2002

(54) INDUCTIVE DETECTION SENSOR HEAD FOR BURIED FERROUS AND NON-FERROUS ELECTRICALLY CONDUCTING OBJECTS

(75) Inventors: Roger Golder; Philip Jones, both of Cambridge (GB)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/680,409

(22) Filed: Oct. 4, 2000

(30) Foreign Application Priority Data

Oct. 13, 1999 (EP) .............................................. 99308054

(51) Int. Cl.⁷ ................................................. G01V 3/10
(52) U.S. Cl. ......................... 324/329; 324/232; 324/243
(58) Field of Search ................................. 324/326, 329, 324/232, 239–243, 207.17

(56) References Cited

U.S. PATENT DOCUMENTS

| | | | | |
|---|---|---|---|---|
| 2,546,771 A | * | 3/1951 | Mork | 324/243 |
| 2,680,226 A | * | 6/1954 | Whitehead et al. | 324/326 |
| 3,742,341 A | * | 6/1973 | Clowes et al. | 324/329 |
| 3,875,502 A | * | 4/1975 | Neumaier | 324/241 |
| 4,016,487 A | * | 4/1977 | Neumaier | 324/232 |
| 4,293,816 A | * | 10/1981 | Johnson | 324/329 |
| 4,894,617 A | * | 1/1990 | Urbani | 324/329 |
| 4,926,127 A | * | 5/1990 | Auslander et al. | 324/329 |

* cited by examiner

Primary Examiner—Gerard R. Strecker
(74) Attorney, Agent, or Firm—Sidley Austin Brown & Wood, LLP (57) ABSTRACT

An inductive sensor head for detecting ferrous or non-ferrous electrically conducting objects, in particular rebars in a surrounding medium like concrete or a brick wall, comprising at least one field coil with a small axial length compared to its diameter and at least one twin pair of sense coils with a small diameter compared to the diameter of the field coil. The number of turns of wire on the field coil is small relative to the number of turns of wire on the sense coils. The common axis of the sense coils is arranged perpendicular to the axis of the field coil so that there will be no component or a minimum component of maximum flux that is coaxial with the sense coils. A twin pair of coaxially arranged identical field coils is provided that are sequentially excited for giving not only positional but also depths information. In a center plane between the field coils an orthogonal arrangement of two twin pairs of sense coils is provided enabling for a three-dimensional hidden object positioning. The sensor head according to the invention can be automatically calibrated, controlled and read out under control of a microcontroller.

6 Claims, 6 Drawing Sheets

INDUCTIVE DETECTION SENSOR HEAD FOR BURIED FERROUS AND NON-FERROUS ELECTRICALLY CONDUCTING OBJECTS

FIELD OF THE INVENTION

The invention relates to an inductive sensor head for detecting a ferrous, ferric and/or nonferrous electrically conducting objects buried in a surrounding medium.

BACKGROUND OF THE INVENTION

Metal detectors for detecting ferrous or non-ferrous objects in media like walls of concrete, brick, plaster or the like or in the ground based upon the disturbance or modulation of the inductive coupling between two coils are known in the art. For example, U.S. Pat. No. 5,729,143 describes a microprocessor controlled metal detector which uses a transmitter coil providing a periodically varying magnetic field in combination with a receiver coil connected thereto in an inductive bridge. The detector comprises means for automatically balancing the two overlappingly arranged coils and electronically compensating any initial coil misalignments or unwanted signals, in particular, during an initial calibration step. In a known metal detector, one of the coils, the field coil, generates an alternating magnetic field while the other coil, the sense coil, measures changes caused by a ferrous or non-ferrous material coming into the magnetic flux field while moving the detector over the medium containing the hidden disturbing object.

A problem with the known metal detectors is, on the one hand, the relatively large size, which is unavoidable due to the side-by-side arrangement of the field coil and the sensor coil and, on the other hand, the fact that the detector must be swept over a certain search area in a kind of scanning process.

SUMMARY OF THE INVENTION

It is an object of the invention to provide an inductive sensor head which is small in size and may be used as a hand-held tool or may be integrated into an electric hand-held tool, preferably, a drill hammer.

It is a further object of the invention to provide an inductive sensor head which provides sufficient clear information about a hidden ferrous or non-ferrous electrically conducting object without the necessity of sweeping the sensor head over a certain working area of the medium in which said object may be buried.

The invention provides an inductive sensor head for detecting of ferrous or non-ferrous electrically conducting objects hidden. In particular, such a sensor head comprises at least one larger diameter field coil with a small axial length-to-diameter-ratio and at least one twin pair of co-axially arranged sense coils both having a small diameter compared to the diameter of the field coil. Preferably, the inductance of the sense coil is significantly higher than the inductance of the field coil. The higher the inductance the more sensitive the sense coil is to magnetic changes and the less gain is needed in the amplifiers that follow such elements. The common axis of the twin pair of sense coils extends perpendicular to the axis and in a diameter direction to the field coil, and the axis is positioned in a plane of the winding plane of the field coil or in a plane essentially parallel to the winding plane of that field coil. Further, the two sense coils are positioned in an equal distance from the center of the field coil such that they are penetrated by the same magnetic flux direction of the flux field emanating from the field coil when excitated by an electric current.

For achieving better positional information, in particular for resolving depth information in relation to a hidden object, e.g., a reenforcing bar ("rebar" in the following) from a single position measurement cycle, a significant improvement of the invention is achieved if a twin pair of coaxially positioned field coils is provided. The mutual axial distance of the two field coils can be rather close and may preferably be less than their internal diameter. As a rule, the distance between the field coils is arranged such that the difference in magnetic field strength on a rebar is sufficiently large that it can be accurately measured. In addition, two twin pairs of sense coils with orthogonally arranged axes are positioned in a center plane parallel and approximately at a halfway distance between the winding planes of the two field coils.

As will be described in the following further details, the invention also provides an advantageous driving circuit for the combination of a twin pair of field coils and a double twin-set of sense coils, wherein additional correction coils are provided in series connection with each of the two field coils in order to minimize magnetic offsets due to the fact that the sense coils cannot be or are difficult to be exactly positioned in the magnetic null position of both field coils.

The various features of novelty which characterize the invention are pointed out with particularity in the claims annexed to and forming a part of this disclosure. For a better understanding of the invention, its operating advantages and specific objects attained by it use, references should be had to the drawings and description matter in which there are illustrated and described preferred embodiments of the invention.

BRIEF DESCRIPTION OF THE DRAWINGS

The invention and advantageous details and embodiments thereof will be described in the following with reference to the accompanying drawings in which.

Throughout the various figures of the drawings the same reference numbers and letters are used for identical or corresponding parts.

DETAILED DESCRIPTION OF THE PREFERRED EMBODIMENTS

Figures 1, 1A:
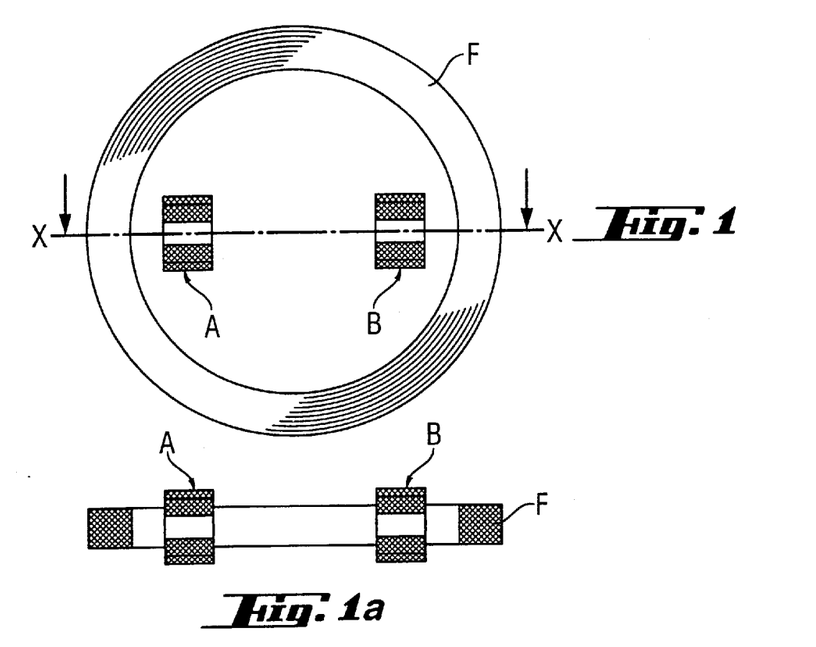
FIG. 1 shows a basic arrangement of a field coil and a twin-set of sense coils, in accordance with the invention.
FIG. 1a shows a side view of the sensor arrangement, of FIG. 1, in the direction of the arrows at line X—X.
Figure 2:
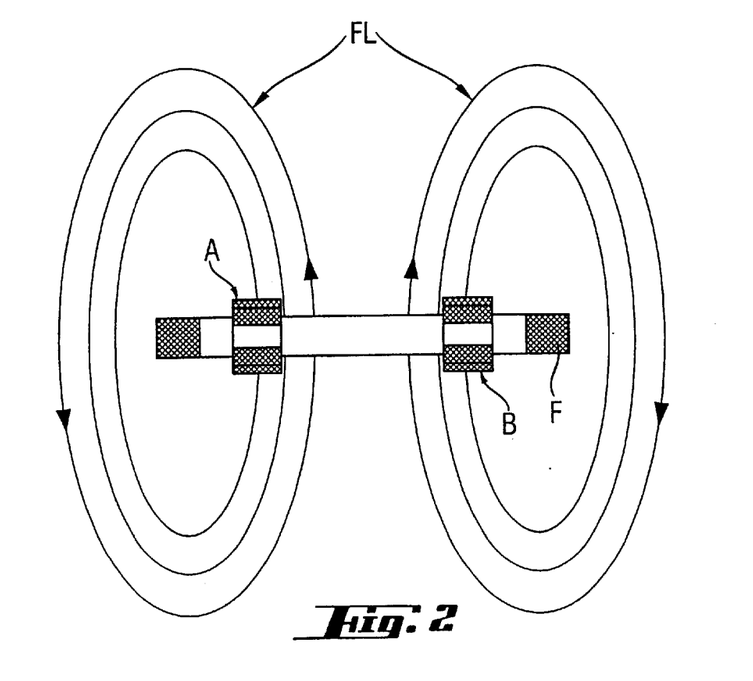
FIG. 2 illustrates the magnetic flux in free space when an excitation current is passing through the field coil of FIG. 1.

FIG. 1 shows the basic magnetic configuration for an induction sensor head, in accordance with the invention. The induction sensor head comprises a relatively large diameter field coil F with few turns of wire and an outer diameter, typically, in the range between 40 and 80 mm and preferably, in the range between 60 and 70 mm. The term "few turns of wire" will be explained in greater detail below. Referring to FIG. 2, an AC current is passed to the field coil F to generate a magnetic field, as indicated by flux lines FL, in free space. The magnetic flux field is measured using a twin pair of small diameter sense coils A, B having many turns of wire compared to the wire turn number of the field coil F. As shown by the schematic top and side views of FIG. 1, the twin pair of sense coils A and B is arranged on a common axis X—X which is oriented perpendicular to the central axis of the field coil F and extends through the diameter thereof. Accordingly, as shown in the lower side view presentation of FIG. 1, the sense coils A, B are arranged within the free space of the field coil F. As can be also seen from FIG. 1, the field coil F is of small axial length compared to its diameter. If no disturbance exists, the magnetic flux vector is parallel to the axis of the field coil F in the interior space encompassed by the field coil F. Since the sense coils A and B are configured such that their common axis is perpendicular to the axis of the field coil F there will be no component of magnetic flux that is coaxial with the sense coils A and B, and hence there will be no voltage induced in them.

Figure 3:
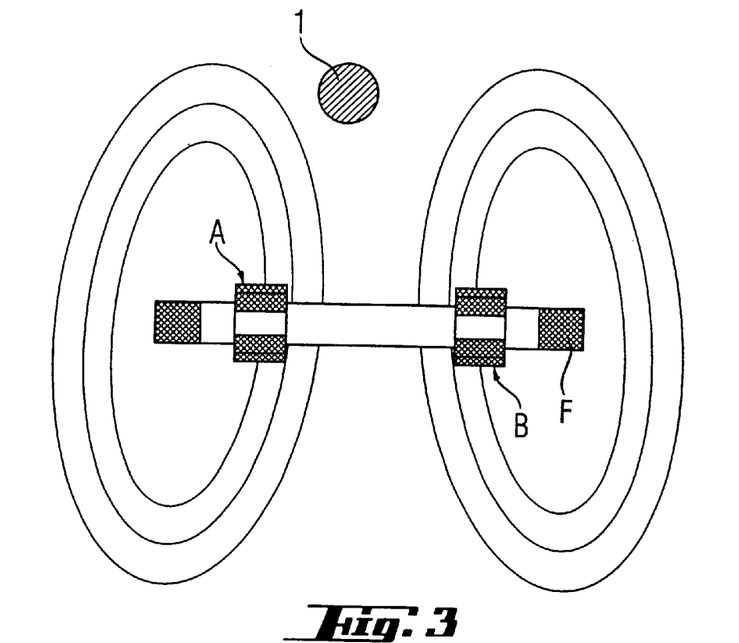
FIG. 3 illustrates how the magnetic field is distorted when a metal object comes into the proximity of the magnetic field emanating from the field coil of FIG. 1.

Referring to FIG. 3, when a metal object 1 (ferrous or non-ferrous), e.g., a rebar is brought or comes into the proximity with the field coil F, the magnetic field is distorted resulting in a component of the magnetic flux vector being coaxial with the sense coils A, B and hence inducing a voltage in the sense coils A, B. The magnitude of the voltage induced is a function of the size, composition and position of the disturbing metal object 1.

Bringing an object 1 with permeability (e.g. a ferrous rebar) into the magnetic field will cause a local increase in magnetic flux density which can be considered to twist the flux lines resulting in an induced voltage in the sense coils A, B. Non-ferrous conductive objects (e.g. copper) also disturb the magnetic flux field possibly due to induced eddy currents. Although eddy currents may also be induced in ferrous conductors such as rebars, it is believed that the effects due to permeability dominate.

Figure 4:
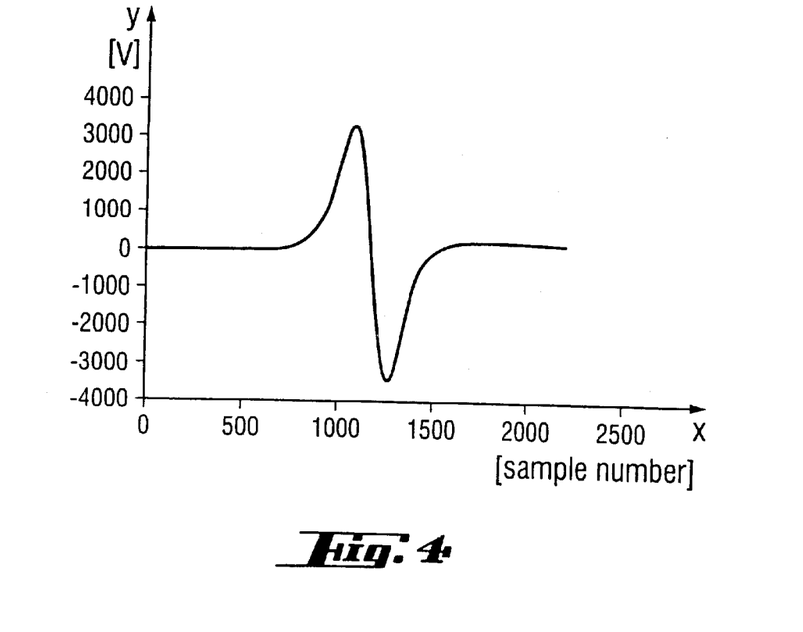
FIG. 4 is a diagram of the output voltage from each of the two sense coils in FIG. 1 when an object of a certain permeability (e.g. a rebar) is swept across the field and sensor coils arrangement of FIG. 2.

If the rebar, i.e. the object 1, is swept across the assembly in FIG. 3 from right to left, the output voltage from each of the sense coils A, B will be similar to the voltage indicated in the graph shown in FIG. 4. The graph illustrates the magnitude of the voltage from the sense coil as a rebar is swept over it. The Y axis is the magnitude of the voltage V and it has arbitrary units as it will vary with many geometric factors. The X axis is the sample number for the measurement and in this instance is a 5 samples per mm movement.

For each sense coil A, B, the output voltage will be zero when the object 1 is directly over the center of the sense coil(s). From each sense coil we get an S curve shape as shown in FIG. 4. It is evident that the "S" curves for each of the sense coils A, B are displaced by the physical distance between the center line, i.e. the common axis of the sense coils A, B.

Figure 5:
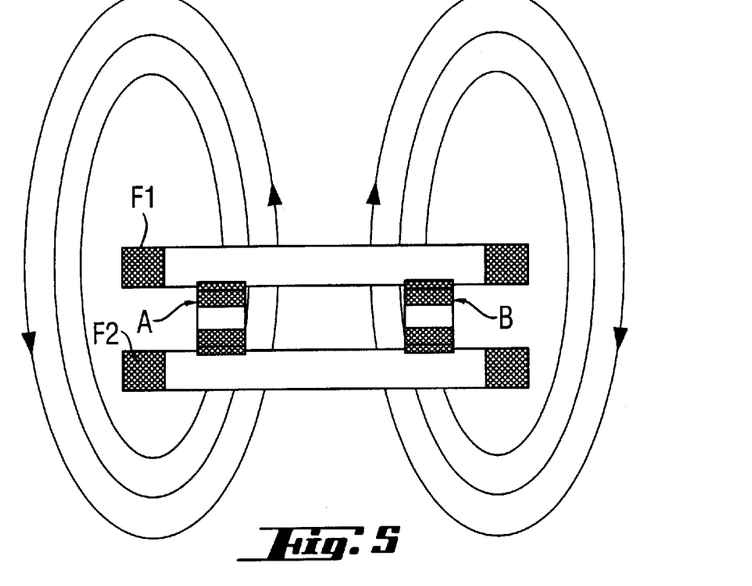
FIG. 5 shows a coil configuration with two identical axially displaced field coils for achieving positional and depth information.

The coils configuration as explained above in connection with FIG. 1 to FIG. 4 give positional information for the disturbing object 1. For a given material of the object 1, the magnitude of the voltage V induced in the sense coils A, B is a function of the size of the object 1 disturbing the magnetic field and its position. However, it is not possible to resolve the depth of the object 1 from a single measurement. With the modified embodiment of the induction sensor according to the invention as described in the following with reference to FIGS. 5 to 10 it becomes possible to also collect additional depth information from a single position measurement. The improvement is the use of a second field coil $F_2$ in addition to the first field coil F., which are indicated in FIG. 5 as "bottom field coil" and "top field coil", respectively. The two field coils $F_1$, $F_2$ are essentially identical and are therefore called a twin pair of field coils. The second or bottom field coil $F_2$ is coaxially arranged with the first or top field coil $F_1$ but axially displaced by a certain distance which usually is smaller than the inner diameter of the field coils $F_1$, $F_2$. This twin-set arrangement of two field coils $F_1$ and $F_2$ enables a second measurement that allows the depth of a disturbing object to be resolved. A certain disadvantage of this configuration arises from the fact that the sense coils A, B cannot be arranged in the magnetic null position of both field coils $F_1$, $F_2$.

FIG. 5 shows that the magnetic flux lines produced, e.g., by the first or top field coil $F_1$, are curved as they pass through the sense coils A, B, and hence there is a component of the magnetic flux vector coaxial with the sense coils A, B. This induces a voltage in the sense coils without the influence of a disturbing object 1, e.g. a rebar.

The depth of an object 1 can be resolved by taking the ratio of the two received signals strengths, one from each of the field coils $F_1$, $F_2$, respectively.

Figure 6:
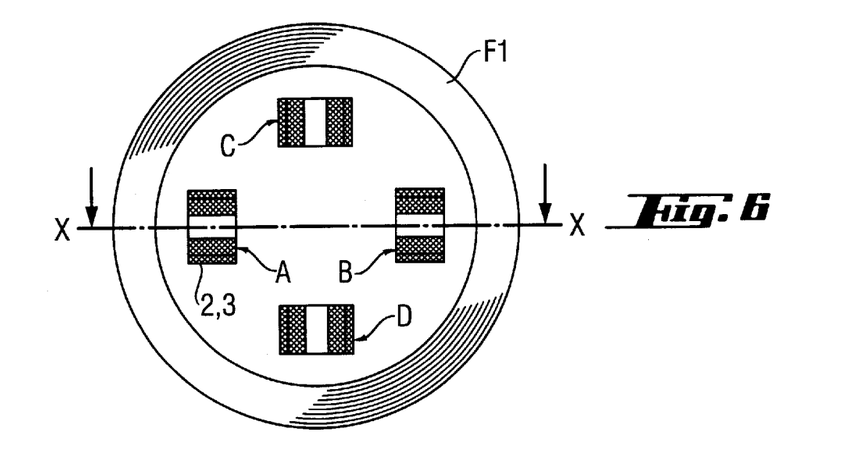
FIG. 6 shows the two field coils as shown in FIG. 5 and two orthogonally arranged twin pairs of sense coils for detecting of a hidden object at an arbitrary angle position within a medium.
Figure 6A:
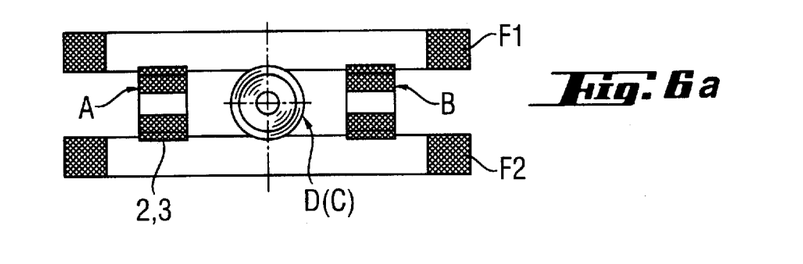
FIG. 6a shows a side view of the sensor arrangement, of FIG. 6, in the direction of the arrows at line X—X.

A further significant improvement is achieved by providing a twin pair of two field coils $F_1$, $F_2$ and two orthogonal twin pairs of sense coils A, B and C, D), respectively, as shown in FIG. 6. The orthogonal pairs of sense coils A, B and C, D, respectively, allow the detection of, e.g., a rebar at an arbitrary angle position.

For reasons of clarity, in the following description, where appropriate, only one twin pair of sense coils will be considered. In practice, however, the signal processing uses the vector sum of the signals produced by the two pairs of sense coils. Again, as in the case of the embodiment shown in FIG. 1, the outer diameter of the field coil twin pair $F_1$, $F_2$ may be in the range between 40 and 80 mm, preferably, in the range between 60 and 70 mm, whereas the inner diameter of the field coils may be in the range between 30 and 70 and preferably, in the range between 45 and 55 mm. The axial distance of the two field coils $F_1$ and $F_2$ may be between 10 and 50 mm, preferably, in the range between 15 and 40 mm and typically about 30 mm.

The winding depth and height of the field coils $F_1$, $F_2$ is typically about 4 to 10 mm and preferably about 7 mm. By the term "few turns of wire" as used in the beginning, a winding number of typically 50 to 250 turns and preferable 100 turns are used resulting in an inductance value of about 1.5 mH for a wire cross section of typically 0.5 mm. The DC resistance of such a field coil is typically in the range of 2Ω.

As for the sense coils, the respective parameters are for the term "many turns of wire" used for the sense winding of about 2000 to 6000 turns, preferably, about 4000 turns resulting for a wire diameter of 0.06 mm in an inductance value of 100 mH. The DC resistance of such a sense coil is in the range of 800Ω, and the non-negligible self-capacitance is about 20 pF. The outer diameter of the sense coils is typically about 15 mm.

To reduce the cost of the field coils drive electronics and get a maximum dø/dt a rectangular AC drive voltage is applied time sequentially to each of the field coils $F_1$ and $F_2$. Of course, due to the series resistance in the drive circuit and the inductance value of the field coils, the driving current is not a linear ramp.

Hence the voltages induced in the sense coils are not rectangular. Rather, the induced voltages are a function of the L/R time constants of the field coils $F_1$, $F_2$.

Figure 8:
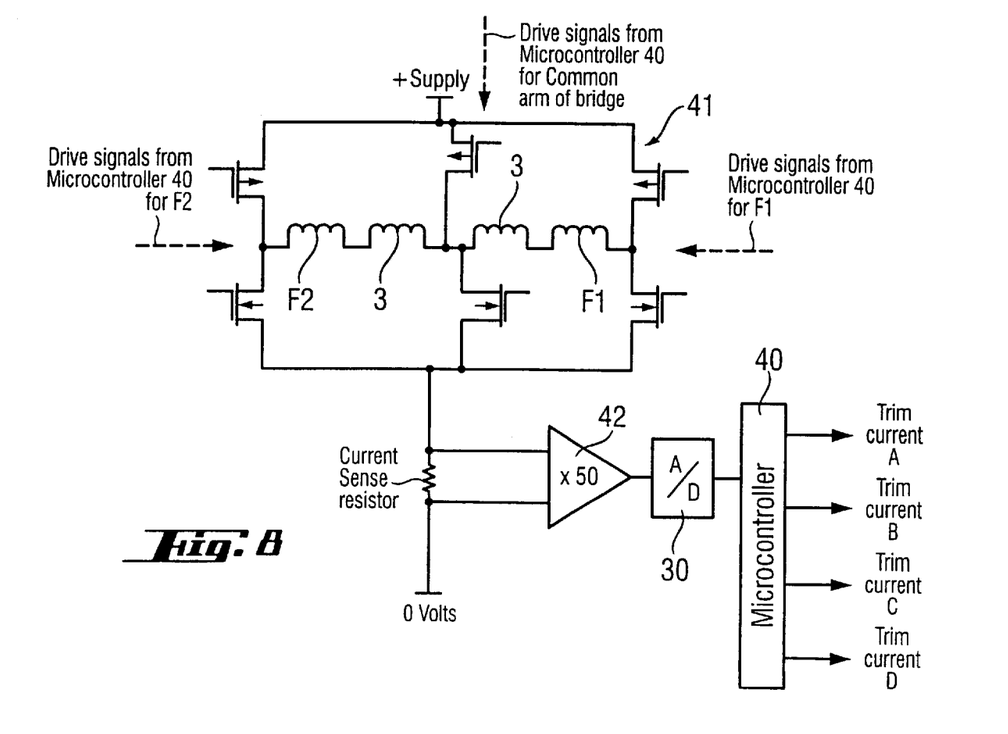
FIG. 8 shows the circuit arrangement of a switching bridge for time sequential driving of a twin pair of field coils additionally provided with correction windings.
Figure 9:
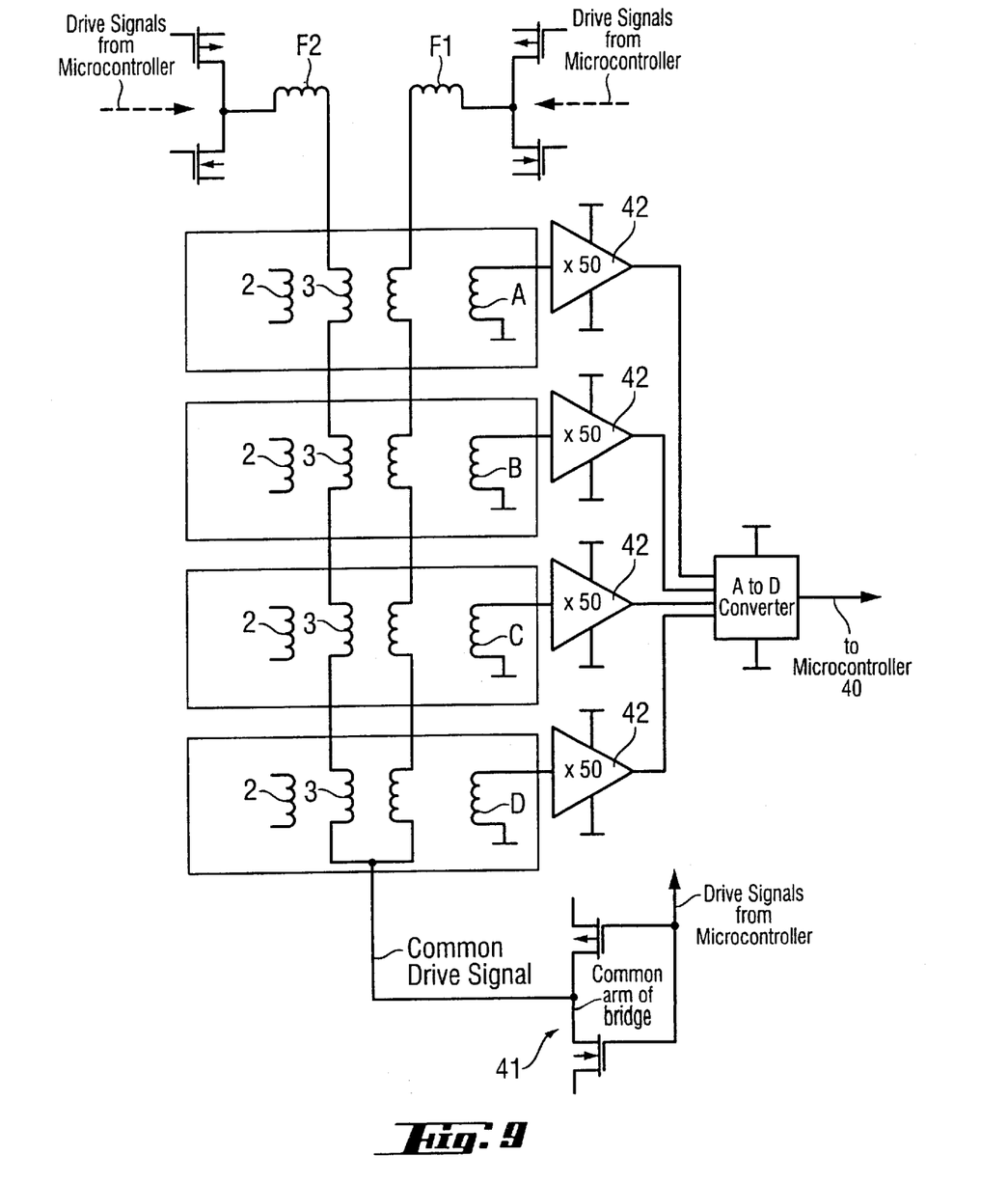
FIG. 9 shows a circuit configuration example of an amplification and multiplexing A/D-converting circuit for the output signal from the two twin pairs of sense coils of FIG. 6.

The induced offset voltage resulting from the sense coils A, B and/or C, D not being arranged in the magnetic null position of the field coils $F_1$, $F_2$ limits the possible pre-amplifier gain. To overcome this problem at least one correction winding 3 can be and should be added to the sense coils A, B, C and D, respectively. As will be further explained below in connection with FIG. 7 to FIG. 9, a fraction of the current exciting the field coils $F_1$, $F_2$ passes through each of such correction windings 3, such that the magnetic field generated by each of the correction windings cancels with that generated by the respective field coil in the vicinity of the sense coils. In addition, each of the sense coils is provided with a trim winding 2 so that each sense coil can be individually adjusted to a precise magnetic null position during calibration of the inductive sensor head. In FIG. 6, the correction winding(s) 3 and the trim winding 2 are only shown for sense coil A. However, it is to be understood that each of the sense coils A, B, C and D is provided with an identical correction winding(s) and trim winding, respectively, as shown in FIG. 9.

Figure 7:
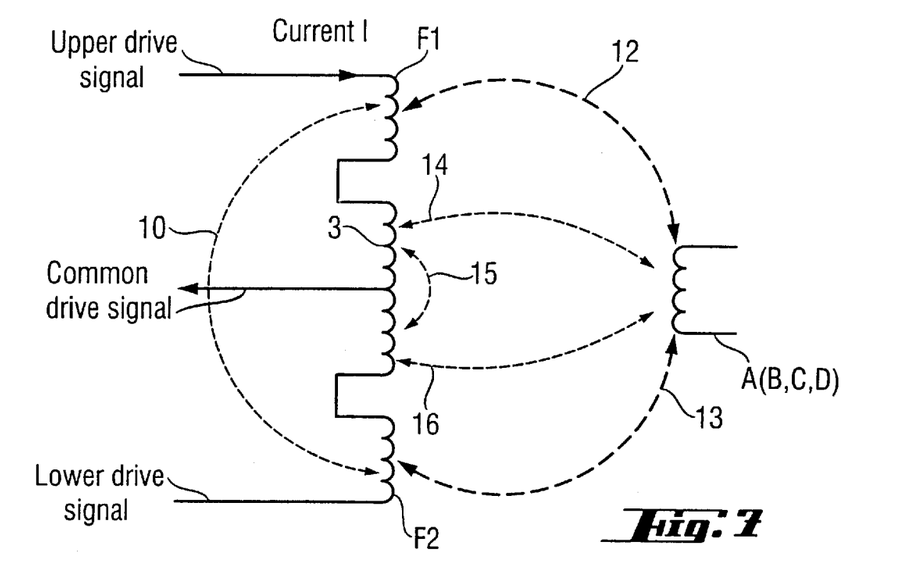
FIG. 7 illustrates the basic principle of a magnetic arrangement of the two field coils of FIG. 5 both additionally equipped with correction windings and trim windings as an adjustment means for magnetic flux correction.

The magnetic diagram of FIG. 7 shows the various magnetic couplings between the field coils $F_1$, $F_2$ and the four sense coils A, B, C, D. As shown by various double arrowed arcs there exists a magnetic coupling 10 between the upper, first field coil $F_1$ and the second, bottom field coil $F_2$, further an electromagnetic coupling 12 and 13, respectively, between the first and the second field coil $F_1$, $F_2$ and the sense coils A, B, C, D, which depends on the presence or absence of a disturbing object 1, e.g. a rebar, respectively, a still further coupling 14, 16 between the correction winding(s) 3 and each of the sense coils A, B, C, D as well as another coupling 15 between the sections of the correction winding(s) 3.

Considering for example a current I flowing into the upper, first field coil $F_1$ and one half of the correction winding 3. This current produces magnetic flux in each coil. The phase and coupling between the correction winding 3 and the sense coils A, B, C, D is such that the component of flux coaxial with the respective sense coil due to the field coil is cancelled in the vicinity of the respective sense coil. For reasons of simplicity and better understanding, the diagram of FIG. 7 only shows one correction winding 3 and one sense coil, e.g. sense coil A. In reality, however, and for the case of four sense coils, there will be four correction windings in series, one coupling to each associated sense coil, as depicted in the schematic electric circuit diagram of FIG. 9. The first one of an inductively coupled pair of correction windings 3 from each of the four sense coil assemblies A, B, C and D, respectively, and one of the two field coils $F_1$ or $F_2$, respectively, are connected in series. The inductively coupled second part of the correction winding 3 from each of the four sense coils and the respective other field coil $F_2$ or $F_1$ are again connected in series. For each of the series connected arms, the phase of the correction windings 3 is set so that the sum of the fluxes from the correction winding 3 and the associated field coil approximately cancels in the vicinity of the sense coil. As there is no net flux coaxial with the sense coils no voltage is induced. When a disturbing object 1, i.e. a rebar is located in the vicinity of the field coils, the couplings 12 and 13 (FIG. 7) between the field coils $F_1$, $F_2$ and the respective sense coil is altered resulting in there being a net component of flux coaxial with the respective sense coil. As there is a net flux coaxial with each of the sense coils, a respective voltage is induced. A subsequent excitation of the bottom, second field coil $F_2$ by a current results in similar observations.

In practice, it is difficult to achieve the adjusting and component tolerances necessary to arrive at a magnetic null at each of the sense coils without some precise and individual adjustment. Therefore, in the embodiment of FIG. 6, and the circuit arrangement of FIG. 9 as well as in the magnetic arrangement of FIG. 7 a further adjustment may be provided by the addition of an extra trim winding 2 on each of the sense coils A, B, C and D, respectively. A small adjustable fraction of the field coil current is passed in each of the trim winding 2 and its magnitude is controlled by a microcontroller 40 (FIG. 8). By changing the magnitude of the trim current by the microcontroller 40 the ratio of the flux from the respective field coil and the sum of the fluxes from the correction windings 3 and trim windings 2 cancel in the vicinity of each of the sense coils.

The circuit diagrams of FIGS. 8 and 9 show the main components of a field coil driver bridge 41 and sense amplifier 42 followed by a multiplexed A/D-converter 30 as a signal input source for microcontroller 40. A display and further user buttons are not shown in the drawings of FIGS. 8 and 9.

In the circuit of FIG. 8 the two field coils $F_1$, $F_2$ in electrical series connection with the associated correction winding(s) 3 are driven by a 4-FET switching bridge. As only one of the field coils is driven at a time, the switching bridge may share common components to save cost. In FIG. 8, the center arm of the bridge 41 is common to both field coils $F_1$, $F_2$ and is always driven by the microcontroller 40. The right or left arms of the bridge are driven by the microcontroller 40 to generate a current in field coils $F_1$ or $F_2$.

As shown in FIG. 9 for each of the four sense coils A, B, C, D there is a sense amplifier 42 having a gain of approximately 50 times. The outputs of the sense amplifiers 42 are supplied to plural input-port A/D-converter 30 which is multiplexed to time-sequentially read the outputs of the four sense amplifiers 42.

The depth of a disturbing object 1, i.e. a rebar may be determined by the use of a prestored knowledge base. The knowledge base is the result of measuring many rebars of different diameters at coverage depths from, for example, 10 mm to 100 mm. To determine the cover or depth of a rebar the following process steps are performed:

S1 Measure the signal strength from each sense coil pair when excitating the bottom, (second) field coil $F_2$;

S2 Measure the signal strength from each sense coil when excitating the upper, (first) field coil $F_1$;

S3 Use these two results as an idex for accessing the depth reading from a pre-stored knowledge base array; and S4 Display the result retrieved from the array.

Figure 10:
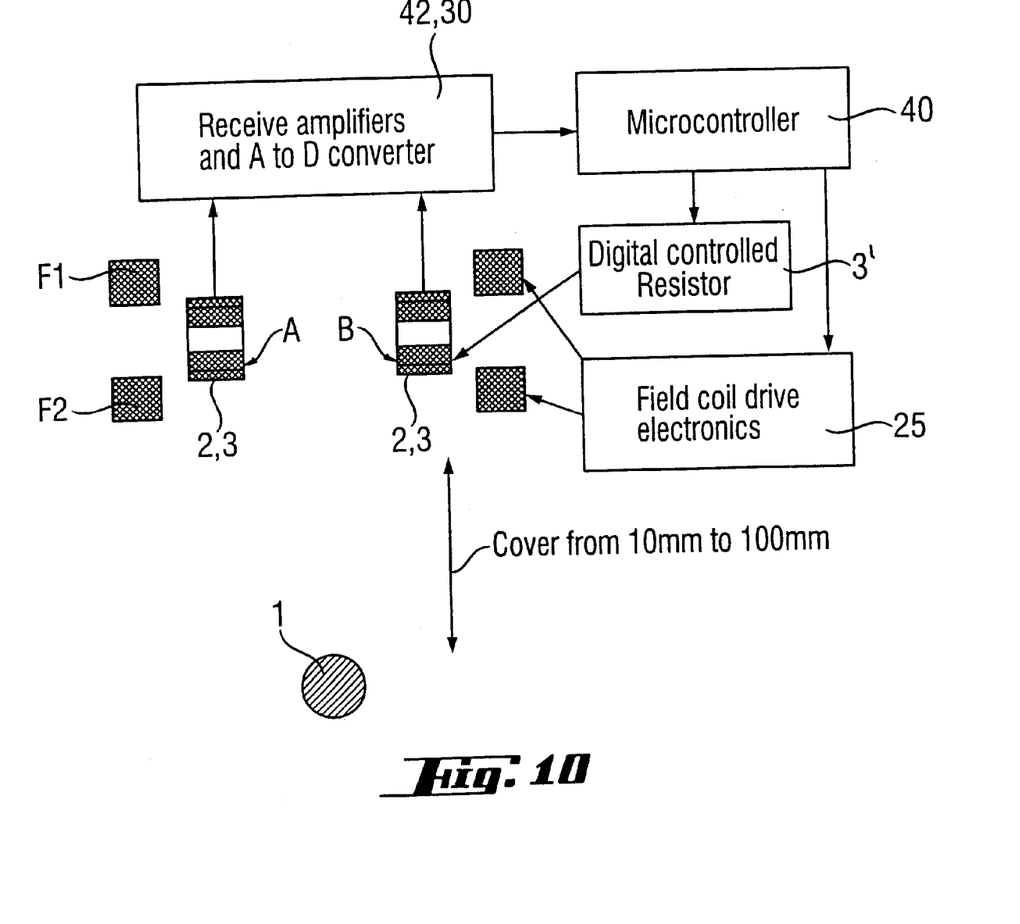
FIG. 10 shows the basic structure of a complete control and read out system of an inductive sensor head according to the invention.

FIG. 10 shows an overall-view for the arrangement and implementation of an inductive sensor head according to the invention with the significant advantage that a hidden object 1 can be located in a horizontal plane but also with respect to its approximate depth within a certain cover range. As shown in FIG. 10, the microcontroller 40 receives the sense coils measuring values via the multiplexed AID-converter 30. The microcontroller 40 controls the digital control resistor 3', which is used to adjust and balance the measuring bridge. For example, during a pre-measurement calibration step, the digitally controlled trim currents for the trim windings 2 are adjusted to optimize the coupling of the correction winding(s) 3. The microcontroller 40 also initiates and controls the field coils drive electronics 25 as for example shown in FIG. 8. For the purpose of clarity, in FIG. 10 only one twin pair of sense coils A, B is shown.

What is claimed as new and desired to be protected by letters patent is set forth in the appended claims:

1. An inductive sensor head for detecting at least one of a ferrous and non-ferrous electrically conducting object buried in a surrounding medium comprising:
   a twin pair of co-axially positioned field coils provided with a mutual distance, each of said field coils having a small axial length-to-diameter ratio; and
   two twin pairs of sense coils with orthogonally arranged axes positioned in a center plane parallel to and at approximately a half distance between the winding planes of said two field coils, each of said two twin pairs of sense coils consisting of two co-axially arranged sense coils having a smaller diameter than a diameter of said field coils and an inductance higher than an inductance of each of said field coils, the common axis thereof being oriented orthogonal to the axis and in a diameter direction of said field coils and in a plane essentially parallel to the winding planes of said field coils, said two twin pairs of sense coils being positioned at an equal distance from the center of each of said field coils and within the same magnetic flux direction emanating from said field coils when excited by an electric current.

2. The sensor head of claim 1, wherein the common axis of said two twin pairs of sense coils is positioned in the winding planes of said field coils and said two twin pairs of sense coils are arranged within the free space of said field coils.

3. The sensor head of claim 1, wherein an inductively coupled twin pair of correction windings is added on at least one of said sense coils, one correction winding of each of said twin pair being arranged in electric series connection to an associated one of said field coils such that in a calibration state of the sensor head the magnetic field generated by said correction windings essentially cancels the magnetic field generated by the field coils in the vicinity of the sense coils.

4. The sensor head of claim 3, wherein a trim winding is provided on each of said sense coils to which a small adjustable fraction of the field coil current is supplied under control of a microcontroller for changing the magnitude of the respective trim currents such that the ratio of the magnetic flux from a respectively excitated field coil and the sum of the fluxes from the correction windings and the trim windings cancel in the vicinity of each of the sense coils.

5. The sensor head of claim 1, further comprising a drive circuit for time sequential excitation of said field coils.

6. The sensor head of claim 5, wherein said drive circuit comprises a switching bridge, one arm thereof consisting of a series connection of said field coils and the respective correction windings, the common coupling point of said correction windings being connected to the coupling point of two series-connected switches forming the other arm said switching bridge.

* * * * *